Sept. 12, 1944.  W. A. MELSOM  2,358,019
FLEXIBLE HOSE COUPLING
Filed Aug. 6, 1942   2 Sheets-Sheet 1

INVENTOR
Walter Arthur Melsom
BY
Albert F. Nathan
ATTORNEY

Patented Sept. 12, 1944

2,358,019

UNITED STATES PATENT OFFICE 2,358,019

FLEXIBLE HOSE COUPLING

Walter Arthur Melsom, Wembley Hill, London, England, assignor to Bowden (Engineers) Limited, London, England, a British company Application August 6, 1942, Serial No. 453,897
In Great Britain October 4, 1941

2 Claims. (Cl. 285—84)

This invention relates to hose coupling components for use with medium and high pressure hose, i. e., hose suitable for pressures of from about 500 lbs. per square inch upwards of the kind in which the hose is gripped between an insert or nipple and a circumferentially continuous external sleeve, these hoses generally being of rubber or other resilient material reinforced by one or more layers of metal or other braiding.

In my specifications Nos. 377,814 and 396,397 I have described an invention whereby the sleeve was formed with a band of enlarged diameter medially of its ends, and a second enlarged band, of lesser diameter than the first, near its open end, and was then contracted on to the hose and insert. The first band corresponded with a zone of "primary" or intense pressure, which was the principal means of sealing the hose on to the insert and holding it within the sleeve, whilst the "secondary" band of lesser pressure checked the escape of the rubber from the coupling, and at the same time avoided the disadvantages which arise if the hose is exposed to flexure about a point of intense pressure.

Although good joints were produced according to this method there was a risk of considerable irregularities in the products occurring, involving in some cases unwanted penetration of the sleeve into the rubber of the hose and also, since rubber is almost incompressible, there was often an undue escape of rubber through the secondary zone as the sleeve was contracted on the hose especially when the hose is made of certain types of synthetic rubber.

I have now found that these difficulties and disadvantages can be wholly or largely overcome if a suitable cavity or suitable cavities is or are present between the sleeve and the hose to receive the rubber displaced by the contraction or substantially the whole thereof, the amount and location of the pressure being so adjusted as to direct the rubber into such cavity or cavities. This not only results in the rubber being concentrated in the most advantageous places but diminishes the risk of rupture of the hose or collapse of the insert.

The present invention is moreover applicable to other forms of sleeve than those claimed in said prior specification.

According to the main form of the present invention I provide a hose coupling component for use with medium or high pressure hose, comprising a flexible hose, a circumferentially continuous sleeve and an insert, in which after contraction there is a medially situated primary or sealing zone and a secondary or throttling zone situated near to the end of the insert which projects into the hose and the interior of the sleeve being so formed and proportioned in relation to the hose prior to the displacement by pressure of the hose material that space is left around the hose between the aforesaid primary zone and the closed end of the sleeve which is sufficient to receive the whole or substantially the whole of the hose material which on the contraction of the sleeve will be displaced from under the said primary zone towards such closed end together with any hose material which may be displaced from the parts lying between such zone and the closed end of the sleeve.

The most important function of the secondary zone in the hose coupling components made according to the present invention is to prevent or reduce the escape of rubber when the sleeve is contracted on the hose, but it may also fulfil another function, viz., to prevent the hose being exposed to undue pressure or constriction at the point about which it will be flexed in use, and to attain this further end the constriction in the secondary zone should be less than that in the primary. The present invention in its broadest form does not, however, depend on the respective pressures in those zones but on the provision of a space or spaces for the reception of the hose material displaced during the contraction of the sleeve on the hose.

It is a characteristic feature of my invention that I provide a cavity or cavities around the hose so as to avoid attempting to force the displaced rubber into a space substantially smaller than its own volume, which, since rubber is practically incompressible, would involve a displacement of some other part of the component, e. g., the sleeve outwards or the insert inwards, and whilst a slight contraction of the insert is not necessarily prejudicial, or might even contribute to the strength of the coupling, I in general aim to make the size of the cavities correspond so far as possible to the volume of the displaced material. The pressure of the displaced material on the inner tube serves to improve the joint, and the cavities should not therefore be greater than the volume of the displaced material, and cavities opening to the exterior of the sleeve would defeat the object of my invention. In order that the displaced material should press on the inner tube the cavities or at any rate the substantial part thereof, must be around this tube, and therefore any space or cavity between the end of the hose and the end of the chamber between sleeve and insert does not assist in attaining the object of my invention, and would in general be prejudicial thereto, moreover if rubber under pressure gets between the end of the hose and the end of the chamber, its pressure would tend to push the hose off the sleeve, and such rubber might also find a way of escape, between the reinforcement and the insert. The hose should therefore be inserted up to the end wall of the coupling.

In determining the size of the cavities to be provided allowance should be made for any internal space in the hose into which the displaced material may be absorbed, such as the interstices present in the internal layer or layers of metallic or textile material, the amount so absorbed necessarily depending on the construction of the hose and the conditions of contraction, and it must be understood that when I speak of the cavities around the hose being sufficient to accommodate the displaced material, I exclude from consideration material which is so absorbed, and therefore needs no provision for its accommodation. Again when the compression of the secondary zone takes place before that of the primary zone some of the hose material in such secondary zone may be displaced to a position in the primary zone, so increasing the bulk of the material to be displaced on the contraction of the latter, or beyond such primary zone, in which case it will diminish the volume of the cavity between the primary zone and the closed end of the sleeve available for the reception of material displaced by the contraction of the primary zone.

The diameter of the insert should preferably be slightly larger than the bore of the hose, to avoid any tendency of the latter to crinkle.

It must be realised in carrying the invention into practice that according to the laws of liquid flow to which rubber under pressure must conform, where there is a region of greater pressure between two regions of lesser pressure there will necessarily be some flow in each direction, though the provision of cavities increases the flow towards them; there must in fact be a line, analogous to a watershed, on the two sides of which the rubber flows in opposite directions.

In addition to the cavity between the primary zone and the closed end of the sleeve I generally provide also a further cavity situated between the two zones, to receive material displaced from the secondary zone inwards or from the primary zone outwards. The provision of such a cavity facilitates the trapping of rubber which would otherwise escape from the hose.

Where, as described in my co-pending application No. 12,840/41 a portion of the hose is bared by intense pressure on the hose, sufficient additional space should be left to contain the hose material so displaced.

The open end of the sleeve, i. e., the end into which the hose enters, may be flared or given a radius which diminishes the risk of the hose sustaining damage when repeatedly bent.

The two pressure zones may merge into each other but must be separate in the sense that there are two peaks of constriction with an intervening part of the passage between them which is wider than at either of these peaks of constriction. It is generally preferable that the peak of constriction of the secondary zone should be situated approximately opposite to the end of the insert.

In some cases the external diameter of the secondary band may be as great as or greater than that of the primary band, or one or both of the external enlargements may be omitted and the desired differential internal constrictions produced by contracting at a medial zone and at a separate secondary zone situated as before described and appropriately varying the degree of contraction so that the internal constriction at the secondary zone is less than that at the primary zone.

The sleeve may not only be of substantially uniform external diameter, but also of substantially uniform thickness, i. e., a simple tube.

Further I may vary the internal diameter of the sleeve from point to point for the purpose of producing zones of varying constriction and for providing cavities into which the rubber displaced on contraction may flow.

These variations might be formed by a separate sleeve or by separate rings appropriately spaced within the main sleeve.

The interior of the sleeve may be formed with circumferential teeth as is known in the art, and when I speak of a sleeve of substantially uniform thickness I include a tube formed with such teeth.

I have found that the form of sleeve which originally has external bands corresponding to the zones of constriction is particularly convenient for manufacturing purposes, and that components formed with such sleeves resist any tendency to open out subsequent to contraction.

In some cases two or more medial zones of constriction may be formed, appropriate spaces being provided for the reception of the displaced rubber. Preferably the maximum constriction in one or all such medial zones is greater than in the secondary zone.

In order that the secondary band may check the escape of the rubber, I may commence and if desired, complete the contraction of the secondary band before the application of pressure to the medial band or bands but the contraction of the medial band or bands may be started before or simultaneously with the contraction of the secondary band.

I prefer to effect the contraction by a number of radially moving devices but my invention in its broad form is not confined to the use of any special means of contraction, although in some forms, e. g., where the original form of the sleeve is a uniform tube or where the secondary band is not of smaller diameter than the medial band or bands, the employment of such devices at any rate for part of the contraction is necessary.

Where the secondary band is of smaller diameter a die or dies operating by relative longitudinal movement of the die and the sleeve might be employed or if the sleeve has a single enlarged band corresponding to the primary zone, the secondary zone might be contracted by the use of one such die, and a second die of larger diameter passed over the secondary zone and the uncontracted part of the sleeve to effect the contraction of the primary zone.

Where radially moving dies are employed, the contraction of the zones can be effected in one operation by the use of a die of appropriate shape. Independent dies may, however, be used, and this enables the contractions to be commenced and/or completed in any desired order. It is preferred to use a circular series of dies.

In order that my invention may be more readily understood I refer to the accompanying diagrammatic drawings, in Fig. 1 of which the upper half shows in section a preferred example of a coupling formed according to my invention before the contraction of the primary band to apply pressure to the hose and the lower half shows the coupling after contraction. Fig. 2 shows a longitudinal section of another form of coupling component according to my invention, and Fig. 3 is a view of a further modified form the upper half in both views showing the component before and the lower half after contraction. Fig. 4 is a half longitudinal section before contraction, of a variant form of coupling component, Fig. 5 showing the condition of the parts after some initial contraction of the sleeve and Fig. 6 the condition when the sleeve has been fully contracted.

1 is the sleeve which is formed with a band 2 of enlarged diameter corresponding to the primary zone, and a second enlarged band 3 corresponding to the secondary zone, 4 is the insert and 5 the hose. The sleeve and insert may be formed in one piece, but I prefer to make them separately and to join them by pressure as described in my specification No. 336,368 and this is the construction shown in the drawings.

6 is a space left between the hose and sleeve into which the major portion of the hose material displaced on contraction as above described is received as shown and 7 is a similar space left for the reception of the rubber displaced from the adjacent portions of the primary and secondary zones.

The separate cavities 6 and 7 may be formed as a result of some initial contraction of the sleeve.

The sleeve has a flared end 8.

In Fig. 2, 1 represents a sleeve of substantially uniform thickness formed with flared end 8.

In the lower part of Fig. 2, 9 shows the part of the sleeve which is most strongly contracted to form the primary zone of constriction, and 10 shows a less strongly contracted part corresponding to the secondary zone. 11 and 12 show uncontracted or less contracted portions of the sleeve.

It will be seen that in the upper half of Fig. 2 the hose is not shown as completely filling the space between sleeve and insert, and consequently the parts 11 and 12 will provide spaces into which the rubber displaced from the pressure zones can flow.

Figure 1:
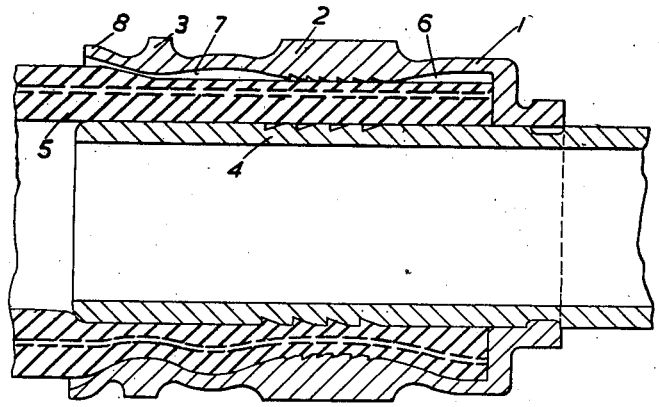
Figure 2:
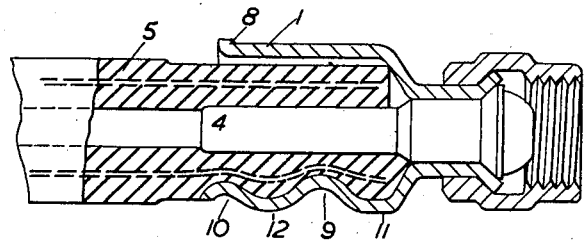
Figure 3:
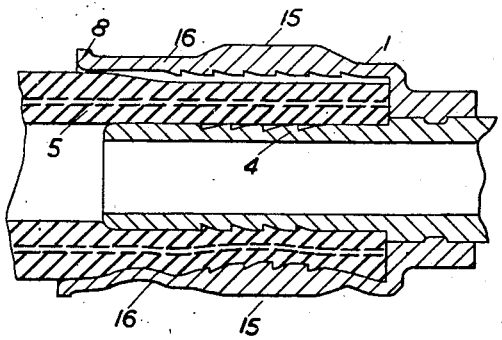
Fig. 3 shows a further variant in which a single enlarged band 15 is formed on the sleeve corresponding to the primary zone, whilst the secondary zone is formed by contracting an unenlarged part 16.
Figure 4:
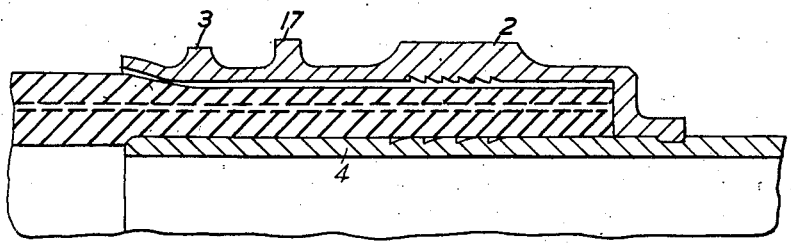
Figs. 4 to 6 show one form in which there is a second medial band 17, which in this example produces a greater constriction than that produced at either of the bands 2 or 3.
Figure 5:
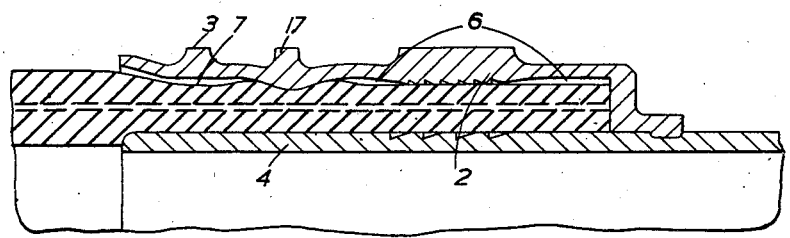
Figure 6:
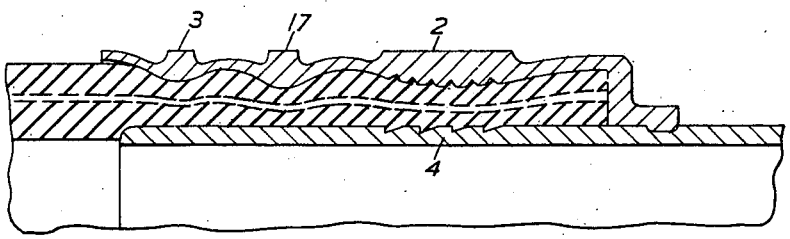

What I claim is:

1. A flexible hose coupling component suitable for use with medium or high pressure hoses comprising a circumferentially continuous metallic sleeve and a rigid insert member forming an annular chamber with one end closed, and a flexible hose of resilient rubber or like material reinforced by at least one flexible layer of reinforcing material embedded between the layers of resilient material inserted in said chamber to the bottom thereof and against which said sleeve is circumferentially contracted medially of the ends of the sleeve to form at least one zone of contraction along the insert, said sleeve having an internal diameter greater than the external diameter of the hose prior to the contraction of the sleeve on the hose so as to provide an annular cavity extending circumferentially around the end of the hose adjacent the closed end of the sleeve adapted to receive and confine therein resilient hose material displaced during the contraction of the sleeve on the hose, the portion of the hose end toward the closed end of the chamber being substantially radially thickened and circumferentially increased in size after contraction of the sleeve relative to its size before contraction by the reception of resilient material into said annular cavity displaced from under said zone, the capacity of said annular cavity being of a size adapted to receive and contain therein the hose material that flows toward the closed end of the sleeve from under said zone of contraction.

2. A flexible hose coupling component suitable for use with medium or high pressure hoses comprising a circumferentially continuous metallic sleeve and a rigid insert member forming an annular chamber with one end closed, and a flexible hose of resilient rubber or like material reinforced by at least one flexible layer of reinforcing material embedded between the layers of resilient material inserted in said chamber to the bottom thereof and against which said sleeve is circumferentially contracted medially of the ends of the sleeve to form a primary zone of constriction along the insert and being also contracted at a separate position nearer the end of the insert which projects into the hose to produce a secondary zone of constriction, said sleeve having an internal diameter greater than the external diameter of the hose prior to the contraction of the sleeve on the hose so as to provide annular cavities extending circumferentially around the end of the hose adjacent the closed end of the sleeve and between said zones of contraction adapted to receive and confine therein resilient hose material displaced during the contraction of the sleeve on the hose, the portion of the hose end toward the closed end of the chamber and between said zones of contraction being substantially radially thickened and circumferentially increased in size after contraction of the sleeve relative to its size before contraction by the reception of resilient material into said annular cavities at each side of said primary zone, the capacity of said annular cavities being of a size adapted to contain therein substantially all of the hose material that flows from under said zones of contraction towards each other and towards the closed end of the chamber.

WALTER ARTHUR MELSOM.